Patented Aug. 25, 1931

1,820,761

UNITED STATES PATENT OFFICE

JASON L. RUSSELL AND HENRY E. MELTON, OF DETROIT, MICHIGAN, ASSIGNORS TO C. E. JAMIESON & COMPANY, OF DETROIT, MICHIGAN, A CORPORATION OF MICHIGAN

MERCURIC RICINOLEATE

No Drawing.   Application filed June 10, 1929.   Serial No. 369,915.

The invention relates to the new chemical compound mercury ricinoleate.

The object of the invention is to obtain certain new compounds adapted for use as germicidal substances and possessing properties rendering them particularly useful for this purpose. We have discovered that the heavy metal ricinoleates are especially adapted for use as germicidal substances and can be applied in proper dilution to the human body without resulting in many of the objectionable reactions incident to the use of other well known antiseptic substances.

Among the many advantages of the heavy metal ricinoleates in proper dilution are, first, that they do not coagulate albumen; second, they are non-irritating to tissue; third, they are non-corrosive to surgical instruments; fourth, they possess comparatively low toxicity; fifth, they are highly germicidal; and sixth, they have a low surface tension. So far as we are aware no other compounds have heretofore been known that possess all of the advantages enumerated above and it will therefore be apparent that the new substances are of great value as therapeutic agents.

The heavy metal ricinoleates may be manufactured in two forms, the colloidal ricinoleates and the non-colloidal ricinoleates. In the manufacture of the colloidal ricinoleates it is preferable to first convert ricinoleic acid into an intermediate compound by neutralizing with sodium carbonate and then drying. This solid compound is then dissolved in distilled water and combined with a solution of a soluble salt of the desired metal which results in the formation of a colloidal solution of the ricinoleate of the metal. In the preparation of the non-colloidal ricinoleates it is preferable to directly combine the ricinoleic acid with the metallic oxides in their direct molecular portions.

As an example of a specific compound coming within the scope of our invention, we will describe the preparation of colloidal mercury ricinoleate. Ricinoleic acid is first neutralized with sodium carbonate and the resulting compound is then dried and obtained in a solid form. The dried compound (sodium ricinoleate) is then dissolved in distilled water in the proportion of 10 gms. per 100 cc. of water. The solution thus formed is designated as Solution A. Another solution is now prepared designated as Solution B, and thus formed by dissolving mercuric chloride in distilled water in the proportion of 3.43 gms. per 116 cc. The Solution B is then slowly added to Solution A with brisk stirring, resulting in the formation of a typical colloidal solution of mercury ricinoleate. With the proportions indicated above the resulting solution contains approximately 3.2% colloidal mercury ricinoleate.

The chemical reactions involved in the process as above described may be shown by means of the following equations:

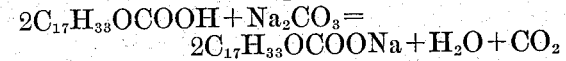

While in the above description we have referred specifically to the preparation of mercury ricinoleate, it is to be understood that our invention includes also other germicidal and antiseptic compounds derived from ricinoleic acid and the heavy metals. Other examples of such compounds include lead ricinoleate, iron ricinoleate and silver ricinoleate.

What we claim as our invention is:

1. As a new composition of matter the substance mercuric ricinoleate.

2. As a new composition of matter colloidal mercuric ricinoleate.

3. A composition of matter derived from ricinoleic acid and having the following probable formula:

4. A composition of matter derived from ricinoleic acid and mercury having the following properties, strongly germicidal, non-coagulating on albumen, non-irritating to tissue, non-corrodible on certain metals, low toxicity, and low surface tension, said composition being represented by the following probable formula:

$$(C_{17}H_{33}OCOO)_2Hg$$

In testimony whereof we affix our signatures.

JASON L. RUSSELL.
HENRY E. MELTON.